(12) United States Patent
Kanemoto et al.

(10) Patent No.: US 10,243,177 B2
(45) Date of Patent: Mar. 26, 2019

(54) CYLINDRICAL BATTERY AND BATTERY ELECTRODE STRUCTURE

(75) Inventors: Manabu Kanemoto, Kyoto (JP); Tadashi Kakeya, Kyoto (JP); Mitsuhiro Kodama, Kyoto (JP)

(73) Assignee: GS Yuasa International Ltd., Kyoto (JP)

( * ) Notice: Subject to any disclaimer, the term of this patent is extended or adjusted under 35 U.S.C. 154(b) by 480 days.

(21) Appl. No.: 14/006,867

(22) PCT Filed: Mar. 23, 2012

(86) PCT No.: PCT/JP2012/057616
§ 371 (c)(1),
(2), (4) Date: Sep. 23, 2013

(87) PCT Pub. No.: WO2012/133233
PCT Pub. Date: Oct. 4, 2012

(65) Prior Publication Data
US 2014/0011076 A1    Jan. 9, 2014

(30) Foreign Application Priority Data
Mar. 25, 2011   (JP) ................. 2011-067363
Mar. 25, 2011   (JP) ................. 2011-067368
(Continued)

(51) Int. Cl.
*H01M 2/02*  (2006.01)
*H01M 2/16*  (2006.01)
(Continued)

(52) U.S. Cl.
CPC ............. *H01M 2/02* (2013.01); *H01M 2/022* (2013.01); *H01M 2/1673* (2013.01); *H01M 4/13* (2013.01);
(Continued)

(58) Field of Classification Search
CPC .................................................. H01M 2/0235
See application file for complete search history.

(56) References Cited

U.S. PATENT DOCUMENTS 3,156,585 A * 11/1964 Yamano ................ H01M 10/28
429/94
4,032,695 A * 6/1977 Coibion .................. H01M 6/10
429/133

(Continued)

FOREIGN PATENT DOCUMENTS

CN   1193197 A   9/1998
EP   0867248     9/1998
(Continued)

OTHER PUBLICATIONS

Extended European Search Report dated Jul. 23, 2014 issued in the corresponding European patent application No. 12764292.4.
(Continued)

*Primary Examiner* — Barbara L Gilliam
*Assistant Examiner* — Nathanael T Zemui
(74) *Attorney, Agent, or Firm* — Rankin, Hill & Clark LLP

(57) ABSTRACT

A cylindrical battery includes a cylindrical battery case and a cylindrical electrode assembly arranged in the battery case and including a positive electrode, a negative electrode, and a separator. The electrode assembly has a slit extending from a first axial end to a second axial end.

10 Claims, 16 Drawing Sheets

(30) Foreign Application Priority Data

May 10, 2011 (JP) ................................. 2011-104933
May 16, 2011 (JP) ................................. 2011-109074

(51) Int. Cl.
*H01M 10/04* (2006.01)
*H01M 4/13* (2010.01)
*H01M 4/66* (2006.01)

(52) U.S. Cl.
CPC ....... *H01M 4/661* (2013.01); *H01M 10/0431* (2013.01)

(56) References Cited

U.S. PATENT DOCUMENTS

| | | | |
|---|---|---|---|
| 4,154,905 A | 5/1979 | Urry | |
| 6,103,424 A | 8/2000 | Yasushi | |
| 6,805,995 B2 | 10/2004 | Yoshinaka et al. | |
| 2002/0009631 A1* | 1/2002 | Yoshinaka | H01M 10/283 |
| | | | 429/94 |
| 2005/0271933 A1* | 12/2005 | Matsumoto | H01M 2/22 |
| | | | 429/127 |
| 2009/0202915 A1* | 8/2009 | Modeki | H01M 4/134 |
| | | | 429/246 |
| 2011/0135981 A1 | 6/2011 | Sato et al. | |

FOREIGN PATENT DOCUMENTS

| | | |
|---|---|---|
| JP | 3911724 | 5/1964 |
| JP | 47-23621 | 11/1972 |
| JP | 58-24967 | 2/1983 |
| JP | 3-245466 | 11/1991 |
| JP | 03-245466 | 11/1991 |
| JP | 06-215796 | 8/1994 |
| JP | 07-099053 | 4/1995 |
| JP | 07-335209 | 12/1995 |
| JP | 08-339821 | 12/1996 |
| JP | 10-021938 | 1/1998 |
| JP | 11-176419 | 7/1999 |
| JP | 11-185767 | 7/1999 |
| JP | 11-224689 | 8/1999 |
| JP | 11-273708 | 10/1999 |
| JP | 11-283612 | 10/1999 |
| JP | 2000-80406 | 3/2000 |
| JP | 2000-315497 | 11/2000 |
| JP | 2001223028 A2 | 8/2001 |
| JP | 2001236983 A2 | 8/2001 |
| JP | 2002-260721 | 9/2002 |
| JP | 2003197267 A2 | 7/2003 |
| JP | 2003-257472 | 9/2003 |
| JP | 2004-335380 | 11/2004 |
| JP | 2008-159357 | 7/2008 |
| JP | 2010-061820 | 3/2010 |
| WO | 01/20705 | 3/2001 |
| WO | 2011/016243 | 2/2011 |
| WO | 2013/012084 | 1/2013 |
| WO | 2013/012085 | 1/2013 |
| WO | 2013/018563 | 2/2013 |
| WO | 2013/038946 | 3/2013 |
| WO | 2013038946 | 3/2013 |

OTHER PUBLICATIONS

International Search Report dated May 29, 2012 filed in PCT/JP2012/057616.
European Office Action dated Feb. 18, 2016 issued in the corresponding European patent application No. 12764292.4.

\* cited by examiner

CYLINDRICAL BATTERY AND BATTERY ELECTRODE STRUCTURE

TECHNICAL FIELD

The present invention relates to a cylindrical battery such as an alkaline secondary battery or a lithium ion secondary battery, and a battery electrode structure applied to a battery such as an alkaline secondary battery or a lithium ion secondary battery.

BACKGROUND ART

As described in, e.g., Patent Document 1, a cylindrical battery for an alkaline secondary battery, such as a nickel-cadmium battery or a nickel-metal hydride battery, is configured such that a positive electrode plate and a negative electrode plate each having a belt shape are wounded spirally with a separator being interposed to form an electrode assembly and the electrode assembly is accommodated and sealed in a cylindrical battery case (referred to as a battery outer case or a container). In order to enhance capacity, this cylindrical battery is configured such that the battery case accommodates the columnar electrode assembly obtained by spirally winding the positive electrode plate and the negative electrode plate in the belt shapes with the separator being interposed so as to be almost solid in the battery case.

Although the increase of capacity of cylindrical batteries has been enhanced in recent years, the applicant of the present invention has been developing a cylindrical battery of low capacity, which corresponds to a purpose of use. More specifically, the applicant of the present invention has been trying to reduce the number of times of spirally winding the positive electrode plate and the negative electrode plate in the belt shapes and accommodate the cylindrical electrode assembly in the battery case.

PRIOR ART DOCUMENT

Patent Document

Patent Document 1: JP-A-2008-159357

SUMMARY OF THE INVENTION

Problems to be Solved by the Invention

In the electrode assembly configured by spirally winding as described above, however, a difference in height at an initially wound portion of the electrode causes distortion in a wound shape, and the electrode at an electrode portion overlapped with the initially wound portion is torn due to deterioration at the electrode portion.

The present invention has been achieved in order to collectively solve the problems, and it is a mainly expected object thereof is to prevent distortion in the wound shape due to the difference in height at the initially wound portion and to prevent tears in the electrode due to the difference in height at the initially wound portion in the cylindrical electrode assembly.

Means for Solving the Problems

A cylindrical battery according to the present invention includes a cylindrical battery case and a cylindrical electrode assembly arranged in the battery case and including a positive electrode, a negative electrode, and a separator, wherein the electrode assembly has a slit extending from a first axial end to a second axial end.

In this configuration, the electrode assembly is provided with the slit extending from the first axial end to the second axial end. It is thus possible to eliminate the difference in height at the initially wound portion so as to suppress distortion in the wound shape due to the initially wound portion and tears in the electrode due to deterioration at the electrode portion overlapped with the initially wound portion.

Provision of the slit indicates that one continuous electrode has an initially wound end and lastly wound end forming a circumferential angle of less than 360 degrees. In other words, the single continuous electrode does not have any overlapped portion, but there is a gap between the initially wound end and the lastly wound end of the electrode.

The conventional electrode assembly spirally wound has an outer diameter that is almost determined at the stage of winding. It is because the outer diameter cannot be easily expanded or contracted due to friction between the adjacent plates. If the outer diameter of the electrode assembly is smaller than the inner diameter of the battery case, the outermost portion of the electrode assembly is not sufficiently in contact with the inner circumferential surface of the battery case, thereby leading to deterioration in charge-discharge efficiency. If the outer diameter of the electrode assembly is larger than the inner diameter of the battery case, it is difficult to accommodate the electrode assembly in the battery case, and the active material held at the outermost plate in the electrode assembly may be scraped by the battery case, for example.

The slit extending from the first axial end to the second axial end in the electrode assembly facilitates expansion and contraction in outer diameter of the electrode assembly. By expanding the outer diameter of the electrode assembly in the state where the electrode assembly is arranged in the battery case, the electrode assembly can be easily pressed against the inner circumferential surface of the battery case, thereby inhibiting deterioration in charge-discharge efficiency. If the electrode assembly is reduced in diameter upon inserting the electrode assembly into the battery case, the electrode assembly can be arranged in the battery case with no damage to the electrode assembly.

In order to simplify the configuration of the electrode assembly and facilitate production thereof, the electrode assembly preferably has a linear slit axially extending from the first axial end to the second axial end.

In the electrode assembly according to a specific aspect, the positive electrode and the negative electrode can form a C shape in a cross section because of the slit axially extending from the first axial end to the second axial end, and the positive electrode and the negative electrode in the electrode assembly can be arranged with the separator being interposed such that the slits thereof communicate each other. In this configuration, the positive electrode and the negative electrode are expanded and contracted around the portions facing the slits, so as to have expansion/contraction centers at substantially same positions. This reduces relative shift between the positive electrode and the negative electrode and thus reduces slippage. The slit of the electrode assembly significantly facilitates expansion and contraction. In an aspect in which the slit of the positive electrode and the slit of the negative electrode are located so as to communicate each other, the slits can be located as to orient in a same direction, for example.

It is preferred that the positive electrode and the negative electrode are arranged with the separator being interposed in the electrode assembly, and at least a set of the slit of the positive electrode and the slit of the negative electrode, which are adjacently arranged via separators in the electrode assembly, are located at circumferentially different positions. Because of the slit extending from the first axial end to the second axial end, the electrode assembly can be easily expanded and contracted and be easily inserted into the battery case. The electrode assembly can be pressed against the battery case after the insertion into the battery case. Furthermore, the respective slits of the positive electrode and the negative electrode adjacent to each other with the separator being interposed are located at circumferentially different positions. The expansion/contraction center of the positive electrode (the portion opposite to the slit of the positive electrode) and the expansion/contraction center of the negative electrode (the portion opposite to the slit of the negative electrode) are thus located at circumferentially different positions. The positive electrode and the negative electrode adjacent to each other are thus less likely to be relatively shifted. The positive electrode and the negative electrode are less likely to be loosened after the outer circumferential surface of the electrode assembly is pressed against and made in contact with the inner circumferential surface of the battery case or the positive electrode and the negative electrode in the electrode assembly are pressed with the separator being interposed. It is thus possible to inhibit deterioration in battery charge-discharge efficiency or separation of the active material of the positive electrode or the negative electrode for a long period of time.

The innermost plate in the electrode assembly will be particularly loosened easily. The respective slits of the positive electrode and the negative electrode adjacent to each other with at least the innermost separator being interposed in the electrode assembly are preferably located at circumferentially different positions.

Preferably, the slit of the positive electrode and the slit of the negative electrode, which are adjacently arranged via each separator in the electrode assembly, are located at circumferentially different positions. In this configuration, each of the positive electrode and the negative electrode adjacent to each other in the electrode assembly are less likely to be relatively shifted. It is possible to more significantly suppress loosening of the electrode.

In order to more significantly achieve the effect that the positive electrode and the negative electrode adjacent to each other are least likely to be shifted, it is preferred that the different positions are circumferentially opposite to each other.

In order to more significantly achieve the effects of the present invention, the electrode assembly can be configured such that a small number of (one to three) positive electrodes and a small number of (one to three) negative electrodes are concentrically and alternately arranged with separators being interposed respectively. In order to most significantly achieve the effects, the electrode assembly can be configured such that one positive electrode wound once and one negative electrode wound once are concentrically arranged with a separator being interposed. Such an electrode wound once has a hollow portion to allow the electrode assembly to be significantly loosened in accordance with charge and discharge. The electrode wound once is relatively thick, so as to press a case surface with larger force. When pressure against the case surface is large, an electrode is easily torn due to a difference in height at the initially wound portion. The effect of providing the slit in order to eliminate the difference in height at the initially wound portion is thus significant. The electrode assembly can be reduced in strength and be expanded and contracted in outer diameter more easily. The present invention is particularly useful for a battery used in a device that is operated with a battery of relatively low capacity (e.g., a remote controller). The battery for this purpose is typically configured without adopting any technique for reducing internal resistance. It is preferred in view of the number of components that the electrode case and an outermost electrode are made in contact with each other without adopting any technique of welding a current collector to an end of an outermost plate or any technique of attaching a tape to an end of the electrode in order to prevent increase in diameter of the electrode assembly having been inserted into the case.

An electrode wound once achieves an electrode assembly that includes one continuous negative electrode or one continuous positive electrode. An electrode wound for a plurality of times achieves an electrode assembly that includes at least two negative electrodes and at least two continuous positive electrodes.

An electrolyte solution preferably has a high concentration in view of a utilization factor of the active material. For example, the concentration of KOH in the electrolyte solution can be raised from 7 M to 8 M. In an electrode assembly wound once, the area of a negative electrode relative to a positive electrode is smaller than a conventional one, thereby possibly leading to increase in internal resistance and deterioration in utilization factor of an active material. The electrolyte solution of a higher concentration suppresses deterioration in utilization factor of the active material.

Preferably there is further included a holder member arranged in a hollow portion of the electrode assembly, between the positive electrode and the separator, or between the negative electrode and the separator, for pressing the electrode assembly from inside to hold the electrode assembly. In this configuration, the holder member presses the electrode assembly from inside. It is thus possible to prevent separation of the active material due to the positive electrode or the negative electrode loosened inward and prevent deterioration in current collection efficiency. The positive electrode or the negative electrode is loosened more significantly if the hollow portion is provided. The holder member holds the electrode assembly of which outer circumferential surface is pressed against the inner circumferential surface of the battery case. It is thus possible to inhibit deterioration in discharge efficiency (for a primary battery) or charge-discharge efficiency (for a secondary battery). It is possible to significantly reduce the amounts of the current collectors of the positive electrode and the negative electrode as well as the amount of the separator by reducing the number of times of winding the electrode assembly into the cylindrical shape. It is also possible to reduce the number of steps for winding and the like.

In order to maximally prevent separation of the active materials in the entire electrode assembly, it is preferred that the holder member is arranged in the hollow portion of the electrode assembly and presses the entire inner circumferential surface of the electrode assembly.

The holder member according to a specific aspect is configured by an elastic plate and is deformed into a cylindrical shape so as to be arranged in the hollow portion of the electrode assembly, between the positive electrode and the separator, or between the negative electrode and the separator. The holder member thus located presses the electrode assembly from inside with elastic restoring force thereof, so as to hold the electrode assembly of which outer circumferential surface is pressed against the inner circumferential surface of the battery case. In this simple configuration in which the plate is deformed into the cylindrical shape and is located in the electrode assembly, the innermost positive or negative electrode can be pressed against the battery case with the elastic restoring force so as to prevent separation of the active material and cause the outer circumferential surface of the electrode assembly and the inner circumferential surface of the battery case to be reliably pressed against each other. The plate can be fitted to the hollow portion of the electrode assembly in any size by simply deforming the plate into a cylindrical shape in any size.

Each of the positive electrode and the negative electrode according to a specific aspect can include a current collector substrate and an active material provided on the current collector substrate. The current collector substrate thus provided follows variation in volume of the active material in accordance with charge and discharge, thereby keeping low electric resistance. Preferably, the current collector substrate is elastic and presses the electrode assembly. In this configuration, the electrode assembly can be pressed by the current collector substrate without providing the holder member. It is thus possible to prevent separation of the active material due to the loosened positive or negative electrode and thus prevent deterioration in current collection efficiency.

A preferred battery electrode structure for prevention of separation of the active material and improvement in current collection efficiency includes: an electrode including a current collector substrate and an active material provided at a first surface and a second surface of the current collector substrate; and a cover in contact with the active material to sandwich the active material between the current collector substrate and the cover; wherein the cover is elastic and electrically conductive.

In such a configuration, the cover is provided to the electrode including the current collector substrate and the active material held on the current collector substrate. It is thus possible to prevent separation of the active material from the current collector substrate and improve current collection efficiency. The cover is electrically conductive, so that a current collection path from the active material apart from the positive current collector substrate can be provided through the cover. This leads to improvement in current collection efficiency.

A positive electrode plate of an alkaline secondary battery can include a foamed nickel porous body and an active material of nickel hydroxide held at the foamed nickel porous body. The foamed nickel porous body has an aperture ratio of at least 95% and a three-dimensional meshwork structure. The positive electrode including the foamed nickel porous body has excellent retentivity for a powdered active material as well as an excellent current collecting function.

The foamed nickel porous body can be replaced with a two-dimensional substrate that is obtained by processing a metal plate such as punched metal or expanded metal.

Unlike the current collector substrate configured by the foamed nickel porous body, the current collector substrate configured by a two-dimensional substrate tends to cause separation of the active material from the current collector substrate due to expansion, contraction, and the like of the active material in accordance with charge and discharge. When the active material is held at the current collector substrate configured by the two-dimensional substrate, the active material is far from the substrate at a portion close to a surface of the plate, thereby leading to low current collection efficiency. Provision of the cover suppresses separation of the active material and improves current collection efficiency.

Each of the current collector substrate and the cover configured by a metal plate can exert strength even with a small thickness. Furthermore, the elastic cover can constantly press the active material toward the current collector substrate in accordance with expansion and contraction of the active material.

The cover is preferably strong enough to constantly press the positive active material with its elasticity. The current collector substrate is preferably elastic.

When the cover has a number of through holes penetrating in a thickness direction, shift of the electrolyte solution and ions is not disturbed. The cover preferably has an aperture ratio from 5% to 60%. Similarly, when the current collector substrate is provided with a large number of through holes penetrating in the thickness direction, shift of the electrolyte solution and ions is not disturbed.

In order to further improve current collection efficiency by preventing separation of the active material provided at the first and second surfaces of the current collector substrate, it is preferred that the cover includes a first cover portion in contact with the active material provided on the first surface of the current collector substrate and a second cover portion in contact with the active material provided on the second surface of the current collector substrate.

In order to more significantly achieve the effect of the cover, the electrode assembly can be configured such that a small number of (one to three) positive electrodes and a small number of (one to three) negative electrodes are concentrically and alternately located with separators being interposed respectively. When the electrode assembly includes a plurality of positive electrodes or a plurality of negative electrodes, each of the positive electrodes and the negative electrodes is preferably provided with a cover. In order to most significantly achieve the effect, the electrode assembly can be configured such that one positive electrode wound once and one negative electrode wound once are concentrically located with a separator being interposed. In such an electrode assembly wound once, pressure is not particularly applied to the electrodes and friction between the adjacent electrodes is small, so that the electrodes tend to be loosened. The provision of the cover more significantly achieves the effect of preventing separation of the active material.

Advantages of the Invention

In the configuration in which the electrode assembly is provided with the slit extending from the first axial end to the second axial end, it is possible to eliminate the difference in height at the initially wound portion so as to suppress distortion in the wound shape due to the initially wound portion and tears in the electrode due to deterioration at the electrode portion overlapped with the initially wound portion.

MODES FOR CARRYING OUT THE INVENTION

Described below with reference to the drawings is a secondary battery according to the first embodiment of the present invention.

Figure 1:
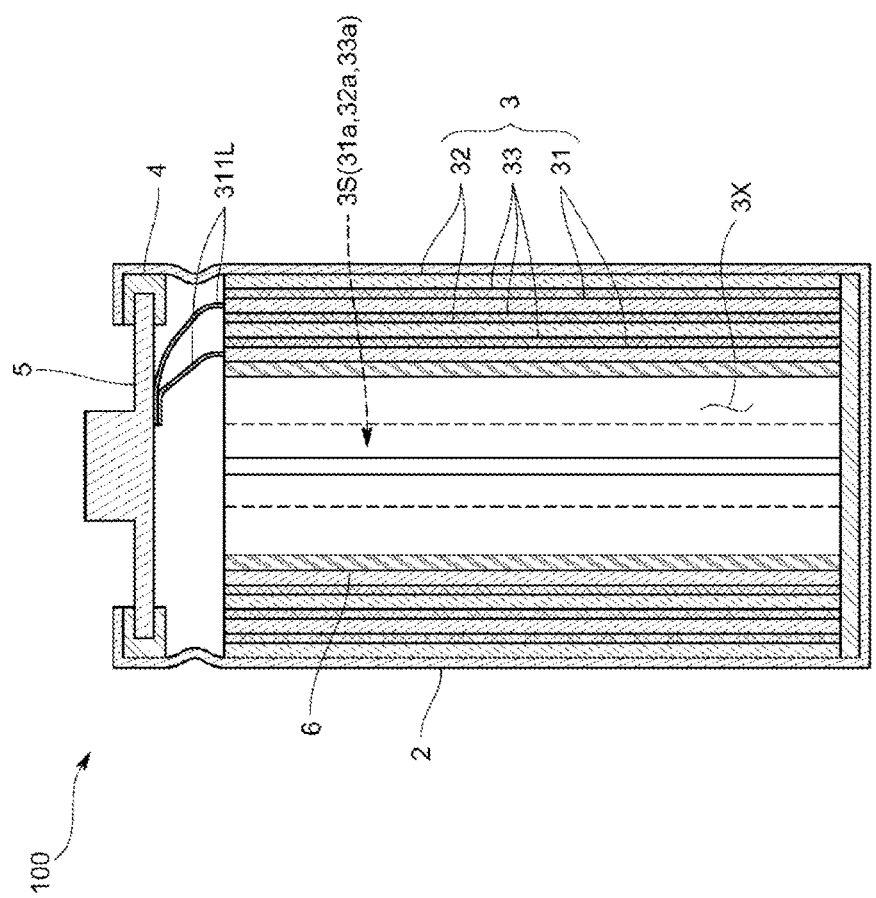
FIG. 1 is a longitudinal sectional view of an alkaline secondary battery according to a first embodiment.
Figure 2:
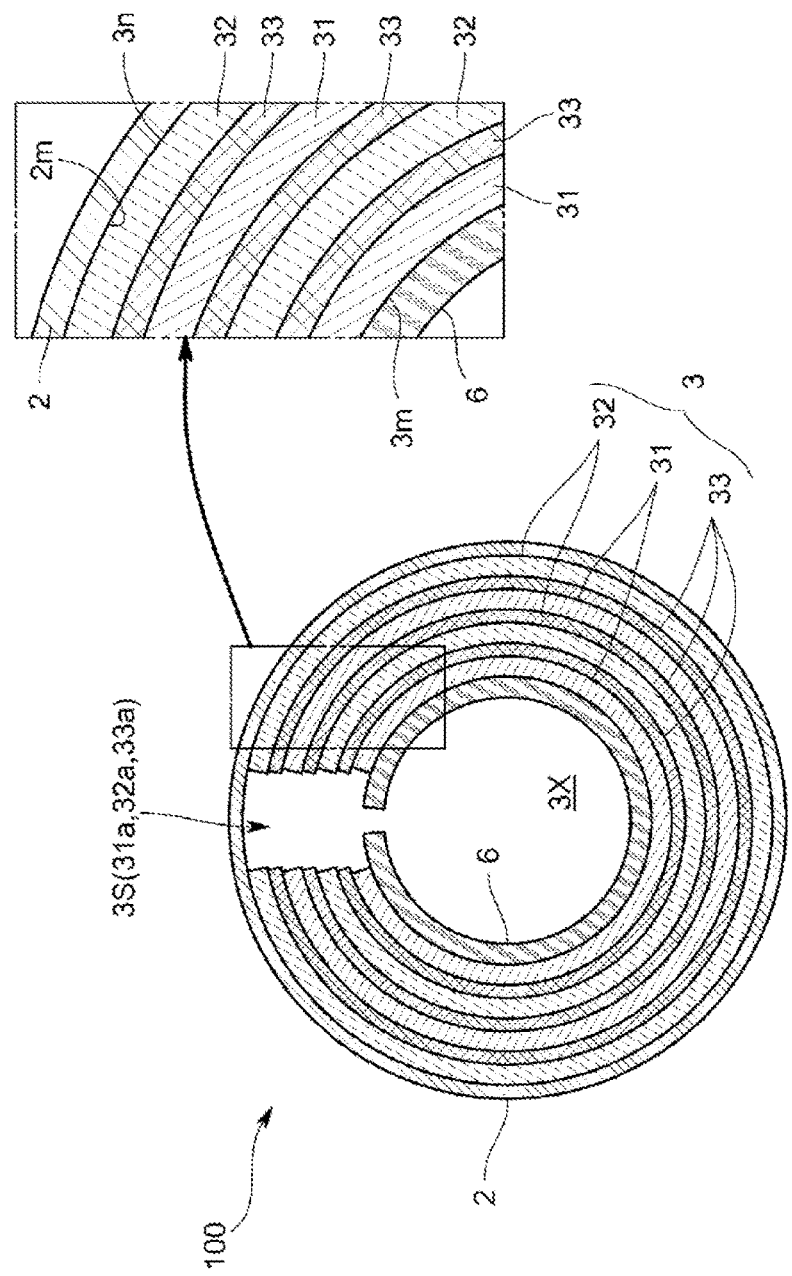
FIG. 2 is a transverse sectional view of the alkaline secondary battery according to the first embodiment.

A secondary battery 100 according to the first embodiment is an alkaline secondary battery such as a nickel-cadmium battery or a nickel-metal hydride battery. More specifically, the secondary battery 100 is a cylindrical battery of a low capacity type in which a AA battery has a capacity of not more than 1800 mAh or a AAA battery has a capacity of not more than 650 mAh, for example. As shown in FIGS. 1 and 2, the secondary battery 100 includes a metal battery case 2 in a bottomed cylindrical shape and a cylindrical electrode assembly 3 arranged in the battery case 2 and including positive electrode plates 31, negative electrode plates 32, and separators 33.

The battery case 2 is coated with nickel and has a bottomed cylindrical shape. As shown in FIG. 1, the battery case 2 has an upper opening that is sealed with a sealing member 5 with an insulating member 4 being interposed. The sealing member 5 has a rear surface at which a lead piece 311L projecting from the upper end of the positive electrode plate 31 is connected by, e.g., welding directly or by way of a current collecting plate (not shown), so that the sealing member 5 functions as a positive terminal. As to be described later, an inner circumferential surface 2m of the battery case 2 is in contact with an outer circumferential surface 3n of the negative electrode plate 32 located at the outermost circumference of the electrode assembly 3 (see the partial enlarged view in FIG. 2). The remaining negative electrode plate 32 is connected to the battery case 2 by way of a current collecting plate (not shown), so that the battery case 2 itself functions as a negative terminal.

The electrode assembly 3 has a cylindrical shape and includes the positive electrode plates 31 and the negative electrode plates 32 that are concentrically and alternately located with the separators 33, which are nonwoven fabric made of, e.g., polyolefin, being interposed. Each of the separators includes an electrolyte solution of, e.g., potassium hydroxide impregnated therein.

The positive electrode plate 31 includes a positive current collector of a punched steel plate coated with, e.g., nickel plating and a positive active material applied on the positive current collector. The positive current collector substrate has a substrate that can be made of foamed nickel. Foamed nickel exerts excellent current collection efficiency. The positive active material can be nickel hydroxide in the case of a nickel-cadmium battery, and can be nickel hydroxide including calcium hydroxide added thereto in the case of a nickel-metal hydride battery.

The negative electrode plate 32 includes a negative current collector of a punched steel plate coated with nickel plating similarly to the positive electrode plates 31 and a negative active material applied on the negative current collector. The negative active material can be a mixture of a cadmium oxide powder and a metal cadmium powder in the case of a nickel-cadmium battery, and can be mainly a hydrogen storage alloy powder of the $AB_5$ type (the rare earth system), the $AB_2$ type (the Laves phase), or the like, in the case of a nickel-metal hydride batter. The positive electrode plates 31 and the negative electrode plates 32 are each configured by not a foamed substrate made of porous nickel or the like but a two-dimensional substrate such as a punched steel plate. The punched steel plate is more likely to have separation of an active material rather than a foamed substrate that has a three-dimensional structure. The punched steel plate is more elastic than a foamed substrate, thereby exerting a significant effect when the electrode assembly is expanded and contracted. Use of a plurality of punched steel plates exerts a more significant effect.

As shown in FIGS. 1 and 2, the electrode assembly 3 has a linear slit 3S extending axially from a first axial end to a second axial end.

More specifically, as shown in FIG. 2, in a state where the positive electrode plates 31, the negative electrode plates 32, and the separators 33 are accommodated in the battery case 2, there are provided linear slits 31a, 32a, and 33a that axially extend from the axial first end to the second axial end of the cylinder, so that a section perpendicular to the axial direction has a C shape. The positive electrode plates 31 and the negative electrode plates 32 are concentrically and alternately arranged with the separators 33 being interposed such that the slits 31a of the positive electrode plates 31 and the slits 32a of the negative electrode plates 32 are oriented in the same direction and communicate one another. The electrode assembly 3 according to the present embodiment has a double structure in which the two positive electrode plates 31 wound once and the two negative electrode plates 32 wound once are concentrically arranged with the separators 33 being interposed such that the slits 31a and 32a thereof are radially aligned. The slits 31a and 32a communicating one another configure the slit 3S of the electrode assembly 3. The linear slit 3S configured in this manner simplifies the structure including the positive electrode plates 31, the negative electrode plates 32, and the separators 33 each of which has a rectangular shape in a planar view and is wound once. Such a simplified structure leads to easier production and reduces defective winding misalignment. In the structure obtained by single winding achieves thicker electrodes by application of an active material same as that of a battery obtained by multiple winding. A positive electrode in the AA size is preferably 1.0 to 2.0 mm thick. A negative electrode in the AA size is preferably 0.3 to 0.8 mm thick. By making the electrodes thicker, larger capacity can be obtained. However, the pressure exerted to a case surface increases, causing many tears in an initially wound portion in each of the electrodes. The slit thus provided eliminates a difference in height at the initially wound portion, which is effective in the structure obtained by single winding.

Figure 3:
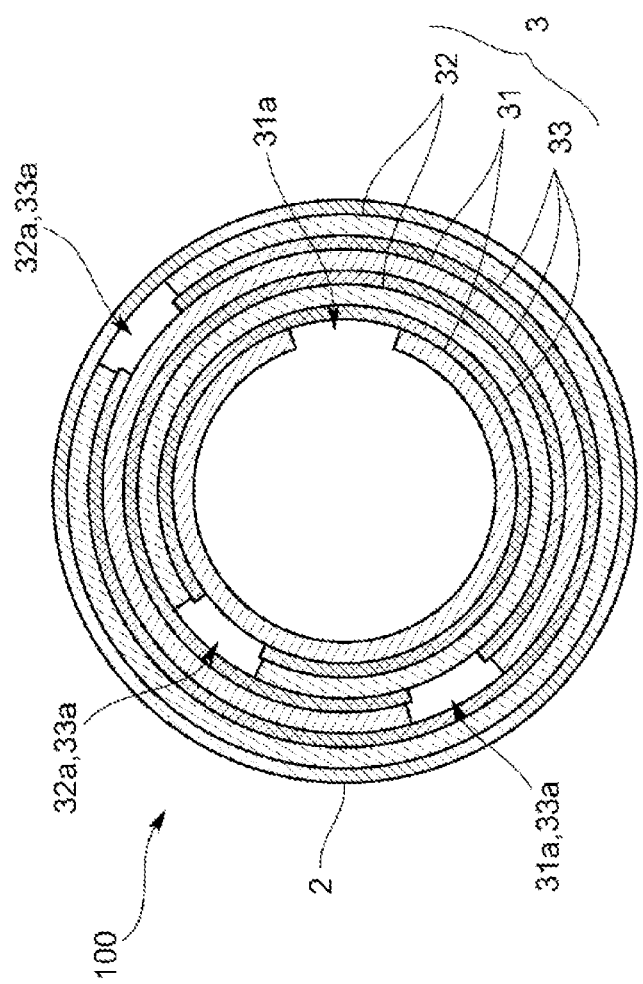
FIG. 3 is a view according to a modification example in which a slit of a positive electrode plate and a slit of a negative electrode plate are located at different positions.

In the cylindrical battery including the electrode assembly 3 configured as described above, the positive electrode plates 31 and the negative electrode plates 32 are expanded and contracted around portions facing the slits 31a and 32a, thereby decreasing relative shift between the positive electrode plates 31 and the negative electrode plates 32 and reducing slippage. In the configuration provided with slits as shown in FIG. 3, the electrode assembly can be expanded and contracted upon insertion into the battery case. In the electrode assembly 3 configured such that the slits 31a of the positive electrode plates 31 and the slits 32a of the negative electrode plates 32 are located at different circumferential positions, the positive electrode plates 31 each have an expansion/contraction center (the portion facing the slit 31a) whereas the negative electrode plates 32 each have an expansion/contraction center (the portion facing the slit 32a) at a circumferential position different from that of the positive electrode plate 31. In this case, the positive electrode plate 31 and the negative electrode plate 32 adjacent to each other tend not to be relatively shifted, so that the electrode assembly 3 is less likely to be increased or decreased in outer diameter as compared to the structure shown in FIG. 2.

As shown in FIGS. 1 and 2, an alkaline secondary battery 100 according to the present embodiment preferably includes a holder member 6 that is arranged in a hollow portion 3X of the electrode assembly 3 and is in contact with an inner circumferential surface 3m of the electrode assembly 3 so as to hold the electrode assembly 3 of which outer circumferential surface 3n is kept in contact with the inner circumferential surface 2m of the battery case 2.

As shown in FIGS. 1 and 2, the holder member 6 is in contact with the inner circumferential surface 3m of the electrode assembly 3, more specifically, with the entire inner circumferential surface of the innermost positive electrode plate 31 in the present embodiment. The holder member 6 is configured by a single flat plate or layered flat plates made of elastic resin such as polypropylene or nylon, or made of metal. The holder member 6 configured by the flat plate is deformed by curving into a cylindrical shape and is arranged in the hollow portion 3X of the electrode assembly 3. The holder member 6 has elastic restoring force that causes an outer circumferential surface 6n of the holder member 6 to press the inner circumferential surface 3m of the electrode assembly 3 and also causes the outer circumferential surface 3n of the electrode assembly 3 to press the inner circumferential surface 2m of the battery case 2 (see the partial enlarged view in FIG. 2). More specifically, the holder member 6 presses and is in contact with the entire inner circumferential surface 3m of the electrode assembly 3. The holder member 6 thus preferably has a length not less than the inner circumferential length of the hollow portion 3X of the electrode assembly 3 and a width substantially equal to the axial length of the hollow portion 3X of the electrode assembly 3. The holder member 6 pressing the inner circumferential surface 3m of the electrode assembly 3 prevents separation of the positive active material of the innermost positive electrode plate 31 as well as separation of the negative active material of the negative electrode plate 32. This inhibits deterioration in current collection efficiency. The holder member 6 holds the electrode assembly 3 of which outer circumferential surface 3n is kept in contact with the inner circumferential surface 2m of the battery case 2, so that the outer circumferential surface 3n of the electrode assembly 3 is reliably in contact with the inner circumferential surface 2m of the battery case 2 and inhibits deterioration in charge-discharge efficiency. The holder member 6 configured by the single plate deformed into the cylindrical shape achieves a large space in the battery 100. This leads to increase in quantity of the electrolyte solution and prevention of increase in inner pressure of the battery.

Next described briefly is a method of producing the alkaline secondary battery 100 configured as described above.

Initially, the two rectangular positive electrode plates 31 and two negative electrode plates 32 are alternately layered with the rectangular separators 33 being interposed. The layered product thus obtained is wound once to form the electrode assembly 3 in the cylindrical shape, and then it is arranged in the battery case 2. When the electrode assembly 3 is accommodated in the battery case 2, the electrode assembly 3 is reduced in diameter due to the slit 3S. It is thus possible to prevent troubles that the negative active material at the outer circumferential surface 3n of the electrode assembly 3 is brought into contact with the battery case 2 and is scraped, for example. After the electrode assembly 3 is arranged in the battery case 2, the negative electrode plates 32 are each connected by welding or the like to the battery case 2 with a current collecting plate or the like being interposed. The electrolyte solution is then filled into the battery case 2. Subsequently, the holder member 6, which is deformed into a cylindrical shape so as to be smaller than the inner diameter of the hollow portion 3X of the electrode assembly 3, is arranged in the hollow portion 3X. The electrode assembly 3 can be thus fixed to the battery case 2. The lead pieces 311L of the positive electrode plates 31 are connected to the rear surface of the sealing member 5 directly or by way of a current collecting plate (not shown). The sealing member 5 is fixed by caulking or the like to the upper opening of the battery case 2 with the insulating member 4 being interposed. Alternatively, the electrolyte solution can be filled after the electrode assembly 3 is accommodated in the battery case 2 and the holder member 6 is arranged. Further alternatively, the positive electrode plates 31, the negative electrode plates 32, and the separators 33 can be individually wound into a cylindrical shape and be accommodated into the battery case 2 one by one. When the slits 31a and 32a of the positive electrode plates 31 and the negative electrode plates 32 are located at the same position, plural sets (e.g. each including one positive electrode plate 31, one separator 33, and one negative electrode plate 32) can be individually wound into a cylindrical shape and be accommodated in the battery case 2.

Effects of First Embodiment

In the alkaline secondary battery 100 according to the first embodiment thus configured, the electrode assembly 3 has the slit 3S extending from the first axial end to the second axial end. The slit 3S eliminates a difference in height at the initially wound portion and suppresses distortion in the wound shape due to the initially wound portion and tears due to deterioration at an electrode portion overlapped with the initially wound portion.

The electrode assembly 3 has the slit 3S extending from the first axial end to the second axial end, so that the slit 3S facilitates expansion and contraction in outer diameter of the electrode assembly 3. By reducing in diameter of the electrode assembly 3 when arranging the electrode assembly 3 in the battery case 2, the electrode assembly 3 can be arranged in the battery case 2 without damaging the electrode assembly 3. The expansion/contraction centers are preferably located at substantially same positions. The positive electrode plates 31 and the negative electrode plates 32 are expanded and contracted around portions facing the slits 31a and 32a, thereby decreasing relative shift between the positive electrode plates 31 and the negative electrode plates 32 and reducing slippage as less as possible. Furthermore, when the electrode assembly 3 is expanded in outer diameter by the holder member 6 in the state where the electrode assembly 3 is arranged in the battery case 2, the outer circumferential surface 3n of the electrode assembly 3 can be reliably made in contact with the inner circumferential surface 2m of the battery case 2, thereby inhibiting deterioration in charge-discharge efficiency.

Figure 4:
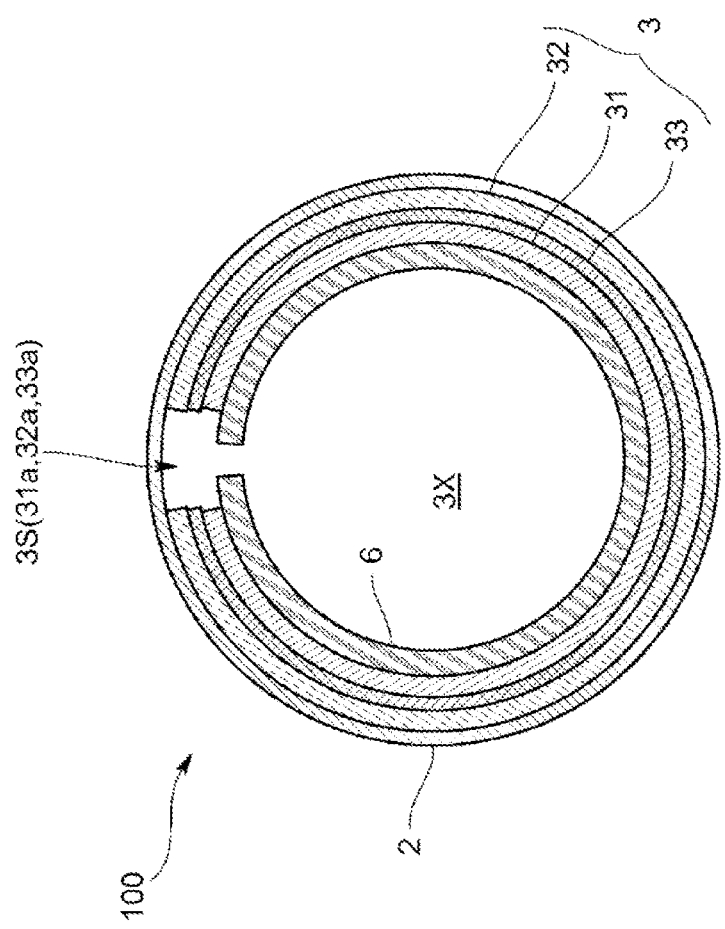
FIG. 4 is a transverse sectional view of an alkaline secondary battery according to a modified embodiment.

It is noted that the present invention is not limited to the first embodiment. For example, the electrode assembly according to the first embodiment having the double structure can alternatively have a single structure (see FIG. 4), or a triple or more structure. The electrode assembly 3 having the single structure has small strength so as to be most easily expanded and contracted in outer diameter thereof.

Figure 5:
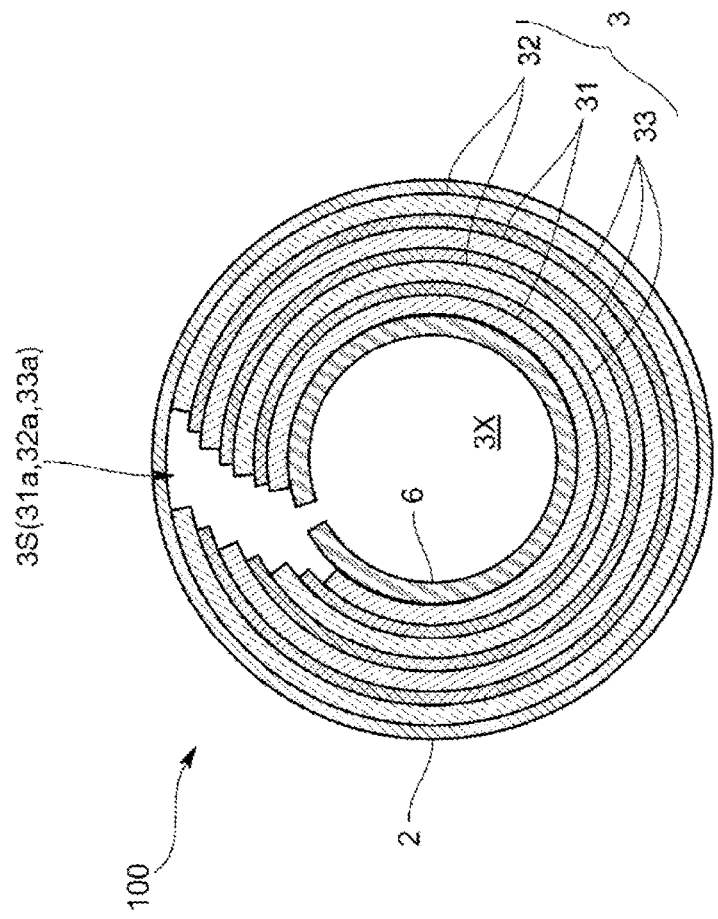
FIG. 5 is a transverse sectional view of an alkaline secondary battery according to a modified embodiment.

The positive electrode plates 31 and the negative electrode plates 32 according to the first embodiment are provided with the slits 31a and 32a that are radially aligned. Alternatively, as shown in FIG. 5, the slits can be concentrically and alternately located so as to be aligned in a direction inclined from the radial direction and communicate one another.

Figure 6:
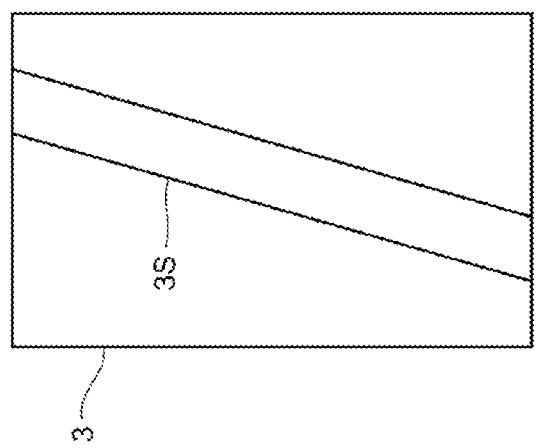
FIG. 6 is a schematic side view of an electrode assembly according to a modified embodiment.

The slit 3S according to the first embodiment extends axially and linearly. Alternatively, as shown in FIG. 6, the slit can extend linearly so as to be inclined from the axial direction, or can be curved or bent in a side view. The slits 31a of the positive electrode plates 31 and the slits 32a of the negative electrode plates 32 can have widths substantially equal to each other or different from each other.

Figure 7:
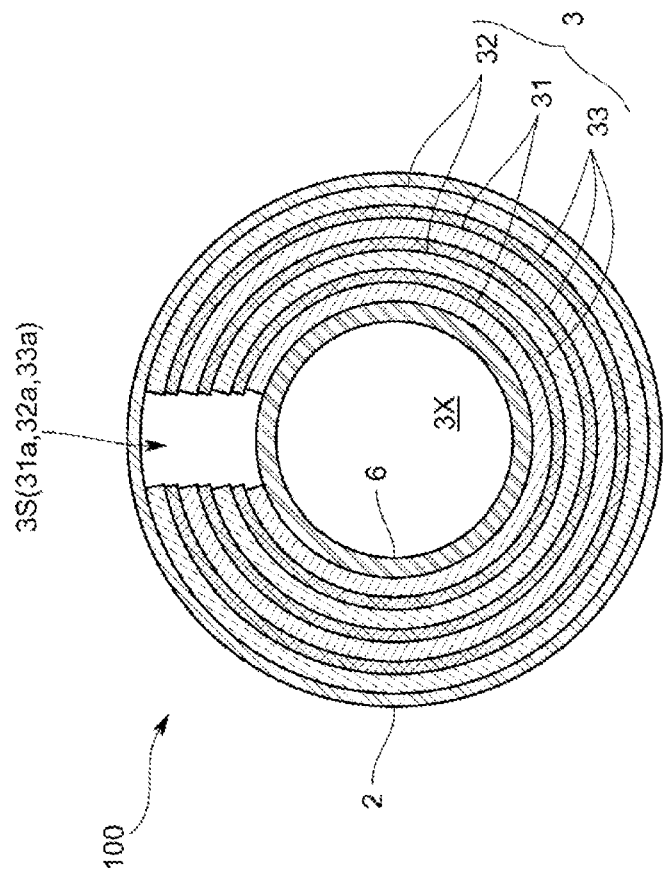
FIG. 7 is a transverse sectional view of a holder member according to a modification example.

Moreover, the holder member 6 can alternatively have an outer circumferential surface that is shaped so as to be fitted to the inner circumferential surface 3m of the electrode assembly 3 in the state where the outer circumferential surface 3n of the electrode assembly 3 is in contact with the inner circumferential surface 2m of the battery case 2. More specifically, as shown in FIG. 7, the holder member 6 can be a resin or metal columnar body having a shape substantially same as that of the inner circumferential surface 3m of the electrode assembly 3 (having an outer diameter substantially same as the diameter of the inner circumferential surface 3m). The holder member 6 configured in this manner can be fitted to the hollow portion 3X of the electrode assembly 3 accommodated in the battery case 2, thereby achieving the effects similar to those of the embodiment described above.

In the first embodiment, the holder member is arranged only in the hollow portion of the electrode assembly. There can be provided additional holder members respectively between the positive electrode plates or the negative electrode plates and the separators. In this case, the holder members each having a belt shape can be layered between the positive electrode plates or the negative electrode plates and the separators and the layered product can be wound once to form the cylindrical electrode assembly, so as to provide the holder members between the positive electrode plates or the negative electrode plates and the separators. This configuration further prevents separation of the active material and allows the outer circumferential surface of the electrode assembly to be more reliably made in contact with the inner circumferential surface of the battery case. In the case where the holder members are provided between the positive electrode plates or the negative electrode plates and the separators, the holder members need to be made of a porous material so as to provide paths for ions.

The positive electrode and the negative electrode according to the first embodiment are each produced by applying an active material to a punched steel plate. Alternatively, these electrodes can be each produced by filling an active material into a foamed substrate made of foamed nickel or the like.

The current collector substrates configuring at least the positive electrode plates or the negative electrode plates can have elasticity so as to press the electrode assembly with the elasticity. In this configuration, the current collector substrates can press the electrode assembly with no use of any holder member. It is possible to prevent separation of the active material due to the loosened positive electrode plates or the negative electrode plates thereby to inhibit deterioration in current collection efficiency.

According to the first embodiment, the electrode assembly is provided at the outermost portion thereof with the negative electrode plate. The present invention is not limited to this configuration, and the electrode assembly can be provided at the outermost portion thereof with a positive electrode plate.

Figure 8:
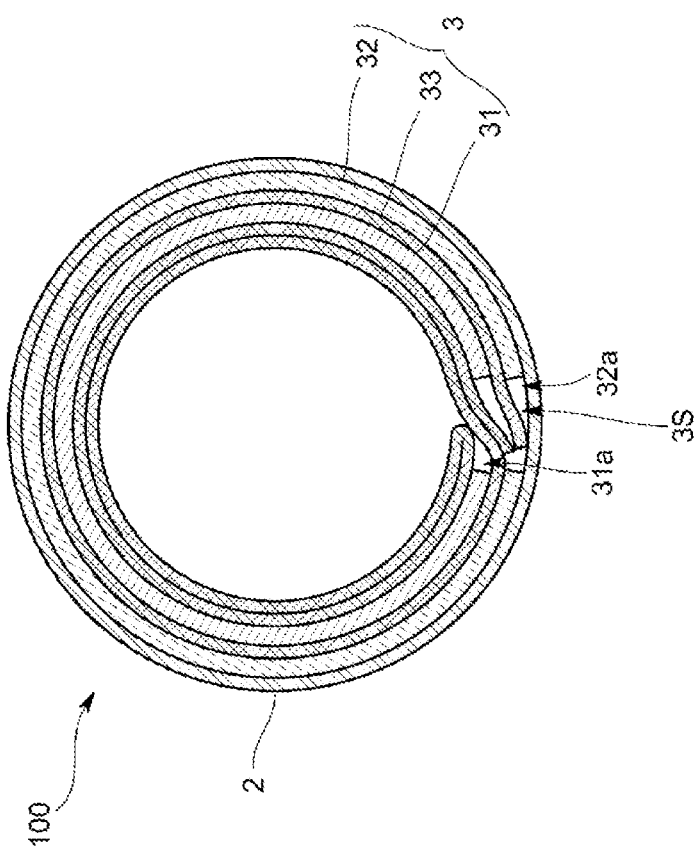
FIG. 8 is a transverse sectional view of an alkaline secondary battery according to a modified embodiment.
Figure 9:
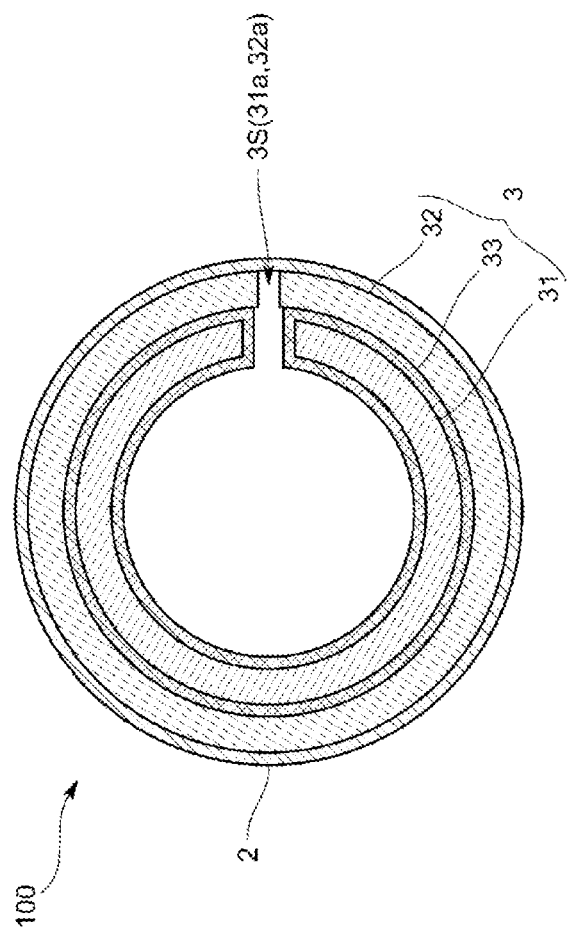
FIG. 9 is a transverse sectional view of an alkaline secondary battery according to a modified embodiment.

As shown in FIG. 8, it is preferred that only the positive electrode plates 31 and the negative electrode plates 32 have the slits 31a and 32a and the separators 33 do not have any slit. A separator 33 having a slit may cause a short circuit between different plates. The separators 33 are preferably made of nonwoven fabric that has excellent contractility. Alternatively, as shown in FIG. 9, each of the separators 33 can have a bag shape and be made of polyethylene or the like, so as to accommodate the positive electrode plate 31.

The present invention is applicable not only to an alkaline secondary battery but also to a secondary battery such as a lithium ion secondary battery and a primary battery.

Second Embodiment

Described next with reference to the drawings is a secondary battery according to a second embodiment of the present invention. It is noted that, in the second embodiment, the members identical or corresponding to those of the first embodiment are denoted by the same reference signs.

A secondary battery 100 according to the second embodiment is different from that of the first embodiment in the positive electrode plates 31, the negative electrode plates 32, and the separators 33 which configure the electrode assembly 3.

Figure 10:
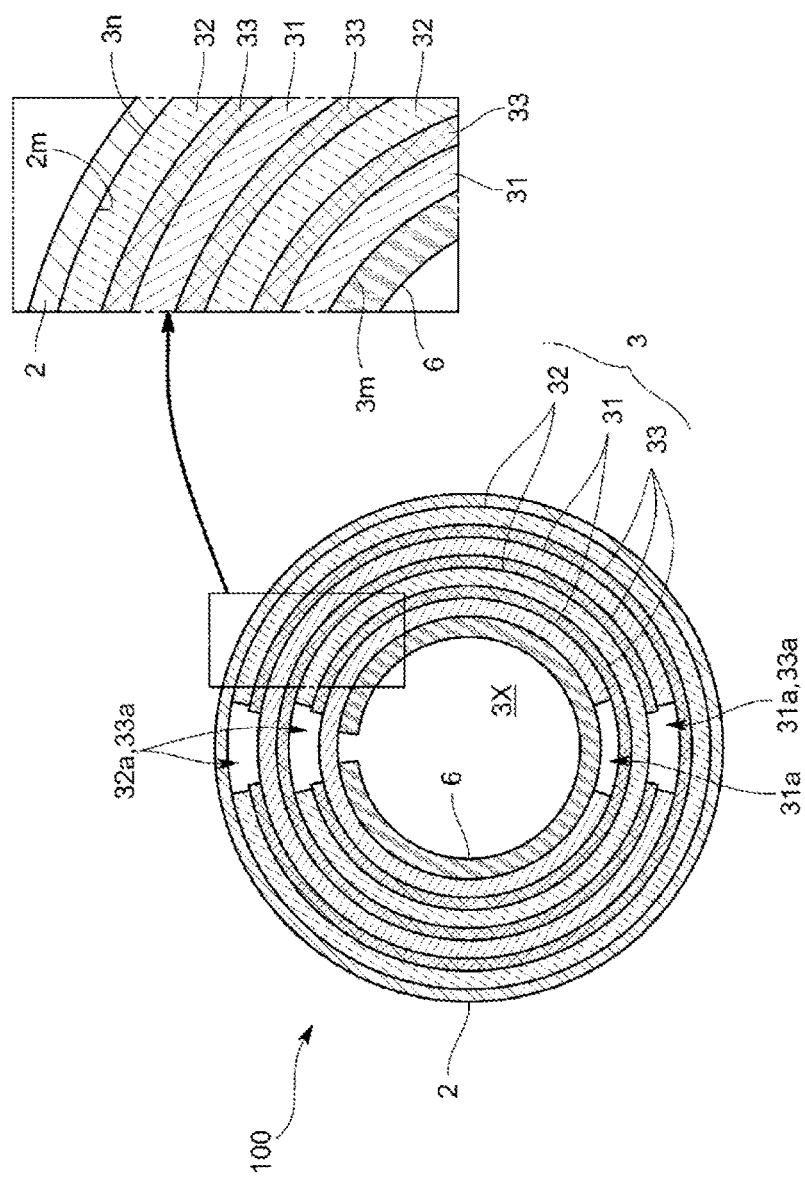
FIG. 10 is a transverse sectional view of an alkaline secondary battery according to a second embodiment.

More specifically, as shown in FIG. 10, in the state where the positive electrode plates 31, the negative electrode plates 32, and the separators 33 are accommodated in the battery case 2, there are provided the linear slits 31a, 32a, and 33a that axially extend from the axial first end to the second axial end of the cylinder, so that a section perpendicular to the axial direction has a C shape. The positive electrode plates 31 and the negative electrode plates 32 are arranged such that the slit 31a of the positive electrode plate 31 and the slit 32a of the negative electrode plate 32 adjacent to each other with each of the separators 33 being interposed are located at circumferentially different positions. The slits 31a of the positive electrode plates 31 and the slits 32a of the negative electrode plates 32 located at the different positions are not circumferentially overlapped with each other. The slits 31a, 32a, and 33a extending linearly simplify the structure including the positive electrode plates 31, the negative electrode plates 32, and the separators 33 each of which has a rectangular shape in a planar view and is wound once. Such a simplified structure leads to easier production.

In the present embodiment, the slits 31a of the plural (two in FIG. 10) positive electrode plates 31 are located as to orient in the same direction and the slits 32a of the plural (two in FIG. 10) negative electrode plates 32 are located as to orient in the same direction. The slits 31a of the positive electrode plates 31 and the slits 32a of the negative electrode plates 32 are located circumferentially opposite to each other, namely, at positions circumferentially different from each other at about 180 degrees. The slits 33a of the separators 33 are located as to orient in the same direction as the slits 31a of the positive electrode plates 31 or the slits 32a of the negative electrode plates 32 so as to communicate each other, in order to reliably insulate the positive electrode plates 31 and the negative electrode plates 32. The electrode assembly 3 according to the present embodiment have a double structure in which the two positive electrode plates 31 wound once and the two negative electrode plates 32 wound once are concentrically located with the separators 33 being interposed such that the slits 31a of the positive electrode plates 31 and the slits 32a of the negative electrode plates 32 are located circumferentially opposite to each other.

In the cylindrical battery including the electrode assembly 3 thus configured, the slit 31a of the positive electrode plate 31 and the slit 32a of the negative electrode plate 32, which are located adjacent to each other with each of the separators 33 being interposed, are located at circumferentially different positions. The positive electrode plate 31 and the negative electrode plate 32 adjacent to each other are thus less likely to be relatively shifted. In contrast, as shown in FIG. 2 according to the first embodiment, in the electrode assembly 3 in which the slits 31a of the positive electrode plates 31, the slits 32a of the negative electrode plates 32, and the slits 33a of the separators 33 are located at the circumferentially same positions, the positive electrode plates 31, the negative electrode plates 32, and the separators 33 are expanded and contracted around the portions facing the slits 31a, 32a, and 33a. The positive electrode plate 31 and the negative electrode plate 32 adjacent to each other tend to be relatively shifted and be loosened.

As shown in FIG. 10, the alkaline secondary battery 100 according to the present embodiment preferably includes a holder member 6 that is arranged in the hollow portion 3X of the electrode assembly 3 and is in contact with the inner circumferential surface 3m of the electrode assembly 3 so as to hold the electrode assembly 3 of which outer circumferential surface 3n is kept in contact with the inner circumferential surface 2m of the battery case 2. This holder member 6 is configured similarly to that of the first embodiment.

Next described briefly is an exemplary method of producing the alkaline secondary battery 100 according to the second embodiment.

Initially, one rectangular negative electrode plate 32 is wound once into a cylindrical shape and is then accommodated in the battery case 2. Subsequently, one rectangular separator 33 is wound once into a cylindrical shape and is then accommodated inside the negative electrode plate 32 in the battery case 2. Then, one rectangular positive electrode plate 31 is wound once into a cylindrical shape and is then accommodated inside the separator 33 in the battery case 2. In this manner, another negative electrode plate 32, another separator 33, and another positive electrode plate 31 are repetitively accommodated in this order. Every time each of the negative electrode plates 32, the separators 33, and the positive electrode plates 31 are accommodated, the plate is expanded so as to press and come into contact with the inner circumferential surface of the battery case 2 or the inner surface of the electrode plate 31 or 32 or the separator 33 that is already accommodated. After the electrode assembly 3 is arranged in the battery case 2, the negative electrode plates 32 are each connected by welding or the like to the battery case 2 with a current collecting plate or the like being interposed. The electrolyte solution is then filled into the battery case 2. Subsequently, the holder member 6, which is deformed into a cylindrical shape so as to be smaller than the inner diameter of the hollow portion 3X of the electrode assembly 3, is arranged in the hollow portion 3X. The electrode assembly 3 can be thus fixed to the battery case 2. The lead pieces 311L of the positive electrode plates 31 are connected to the rear surface of the sealing member 5 directly or by way of a current collecting plate (not shown). The sealing member 5 is fixed by caulking or the like to the upper opening of the battery case 2 with the insulating member 4 being interposed. Each of the negative electrode plates 32 can be connected to the current collecting plate every time the corresponding negative electrode plate 32 is accommodated in the battery case 2. Alternatively, the electrolyte solution can be filled after the electrode assembly 3 is accommodated in the battery case 2 and the holder member 6 is arranged.

Effects of Second Embodiment

In the alkaline secondary battery 100 according to the second embodiment thus configured, the slit 31a of the positive electrode plate 31 and the slit 32a of the negative electrode plate 32 adjacent to each other with each of the separators 33 being interposed are located at circumferentially different positions. The expansion/contraction center of the positive electrode plate 31 (a portion opposite to the slit 31a of the positive electrode plate 31 (the circumferential center)) and the expansion/contraction center of the negative electrode plate 32 (a portion opposite to the slit 32a of the negative electrode plate 32 (the circumferential center)) are located at circumferentially different positions. The positive electrode plate 31 and the negative electrode plate 32 adjacent to each other tend not to be relatively shifted. After the outer circumferential surface 3n of the electrode assembly 3 is pressed against and made in contact with the inner circumferential surface 2m of the battery case 2 or the positive electrode plates 31 and the negative electrode plates 32 configuring the electrode assembly 3 are pressed each other with the separators 33 being interposed, the positive electrode plate 31 and the negative electrode plates 32 are less likely to be loosened. It is thus possible to inhibit deterioration in charge-discharge efficiency of the secondary battery 100 or separation of the active material from the positive electrode plates 31 or the negative electrode plates 32 for a long period of time.

It is noted that the present invention is not limited to the second embodiment. For example, in the second embodiment, all of the slits 31a of the positive electrode plates 31 and the slits 32a of the negative electrode plates 32 are located circumferentially opposite to each other. The slits are not necessarily located opposite to each other but can be located at arbitrary positions circumferentially different from each other, as shown in FIG. 3 according to the first embodiment. In the case where the slits are located at arbitrary positions circumferentially different from each other, there is no need to locate the slits 31a of the positive electrode plates 31 and the slits 32a of the negative electrode plates 32 so as to be opposite to each other during the production of the battery 100, thereby reducing an assembly work load.

Figure 11:
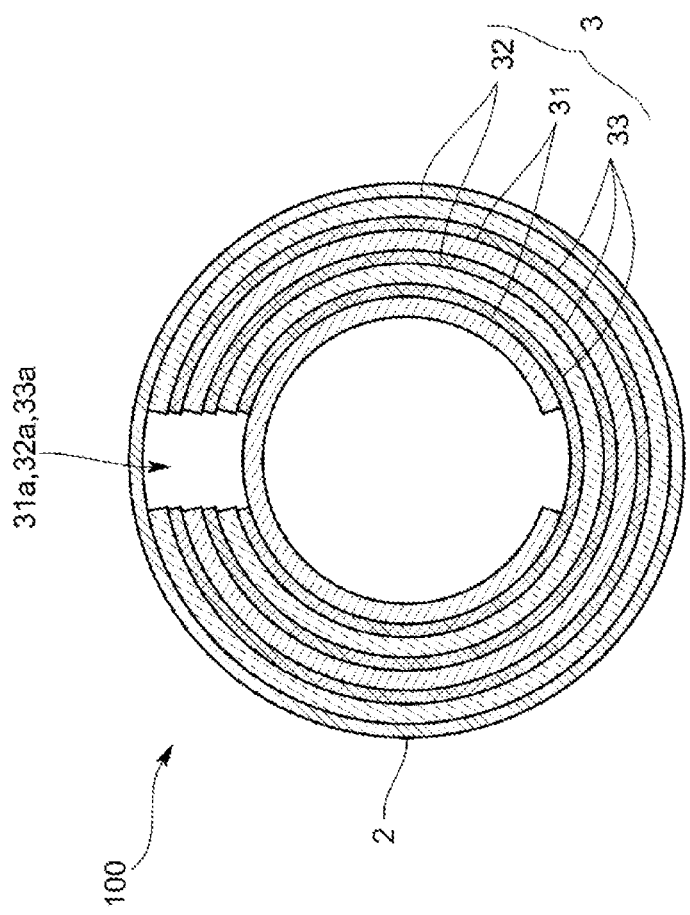
FIG. 11 is a transverse sectional view of an alkaline secondary battery according to a modified embodiment.

According to the above embodiment, the slit 31a of the positive electrode plate 31 and the slit 32a of the negative electrode plate 32 adjacent to each other with each of the separators 33 being interposed are located at the different positions. Alternatively, as shown in FIG. 11, only the slit 31a of the positive electrode plate 31 and the slit 32a of the negative electrode plate 32 adjacent to each other with the innermost separator 33 in the electrode assembly 3 (only the innermost slit in FIG. 11) can be located at different positions. The slits 31a and 32a of the remaining positive and negative electrode plates 31 and 32 are preferably located as to orient in the same direction so as to communicate each other. In this configuration, the electrode plates 31 and 32 having the slits 31a and 32a located as to orient in the same direction can be easily expanded and contracted and thus made in contact with the inner circumferential surface of the battery case 2. By locating the innermost positive electrode plate 31 so as to have the slit 31a in the opposite direction in the state where the outer circumferential surface of the negative electrode plate 32 is in contact with the inner circumferential surface of the battery case 2, the positive electrode plates 31 and the negative electrode plates 32 can be prevented from being loosened.

Third Embodiment

Described below with reference to the drawings is a secondary battery according to the third embodiment of the present invention. It is noted that, in the third embodiment, the members identical or corresponding to those of the first or second embodiment are denoted by the same reference signs. The configuration according to the present embodiment can be combined with that of the first or second embodiment, or may not be combined with that of the first or second embodiment.

Figure 12:
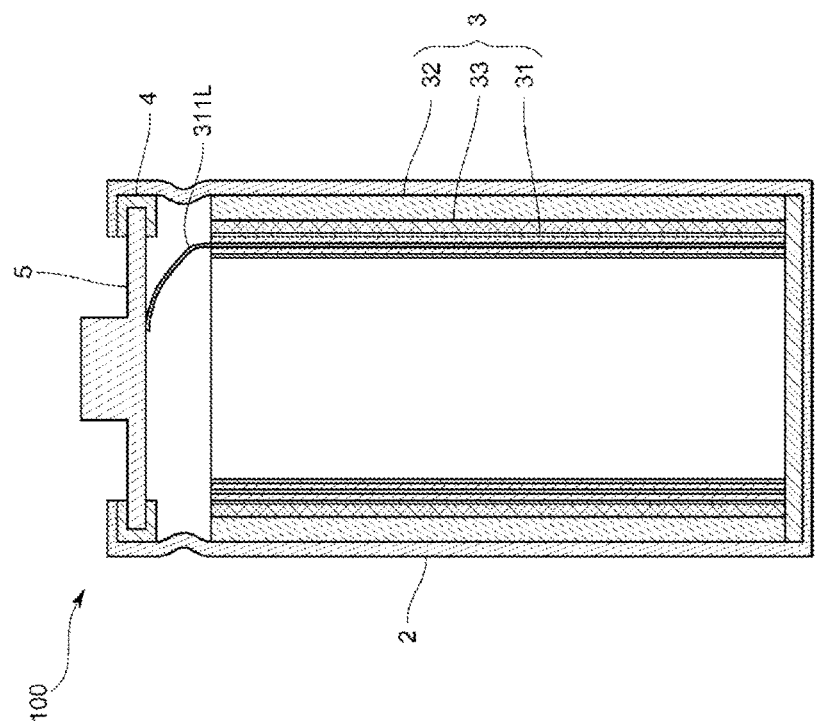
FIG. 12 is a longitudinal sectional view of an alkaline secondary battery according to a third embodiment.
Figure 13:
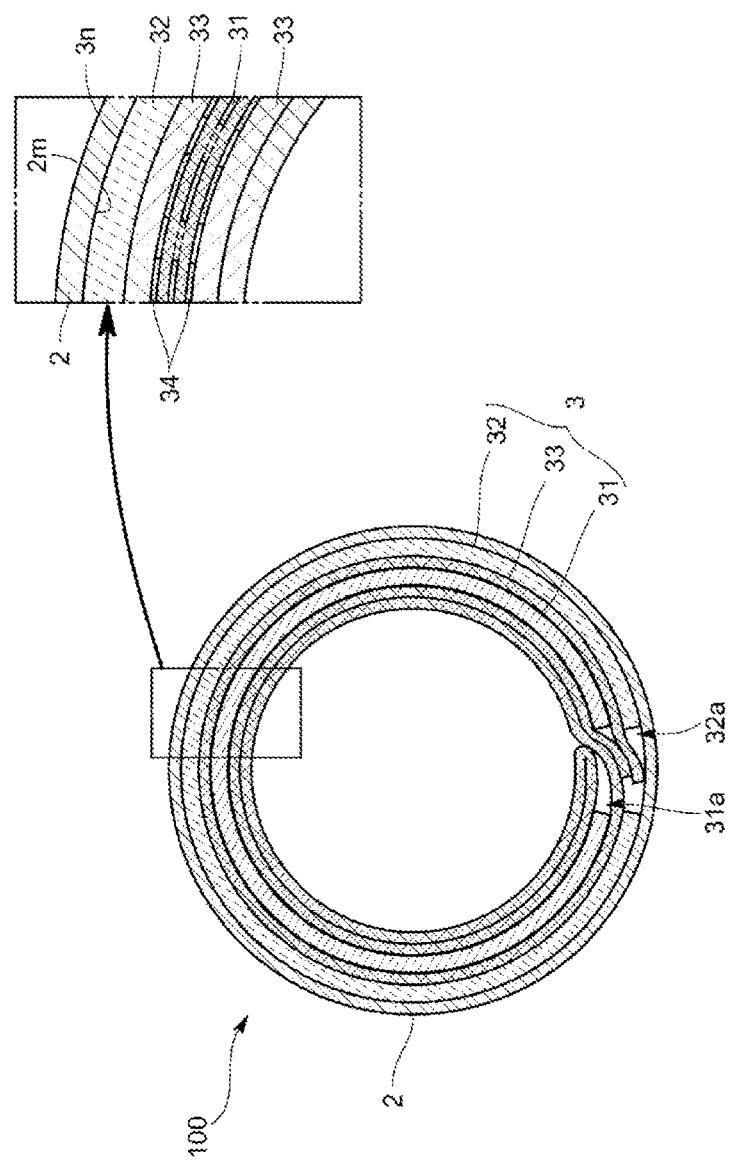
FIG. 13 is a transverse sectional view of the alkaline secondary battery according to the third embodiment.

Similarly to the first embodiment, a secondary battery 100 according to the third embodiment is a cylindrical battery of a low capacity type in which a AA battery has a capacity of not more than 1800 mAh or a AAA battery has a capacity of not more than 650 mAh, for example. As shown in FIGS. 12 and 13, the secondary battery 100 includes a metal battery case 2 in a bottomed cylindrical shape and a cylindrical electrode assembly 3 arranged in the battery case 2 and including a positive electrode plate 31, a negative electrode plate 32, and separators 33.

The battery case 2 is coated with nickel plating and has a bottomed cylindrical shape. As shown in FIG. 12, the battery case 2 has an upper opening that is sealed with a sealing member 5 with an insulating member 4 being interposed. The sealing member 5 has a rear surface at which a lead piece 311L projecting from the upper end of the positive electrode plate 31 is connected by welding or the like directly or by way of a current collecting plate (not shown), so that the sealing member 5 functions as a positive terminal. As described later, in the present embodiment, the battery case 2 has an inner circumferential surface 2m that is in contact with an outer circumferential surface 3n of the outermost negative electrode plate 32 in the electrode assembly 3 (see the partial enlarged view in FIG. 13).

The electrode assembly 3 has a cylindrical shape and includes the positive electrode plate 31 and the negative electrode plate 32 that are concentrically and alternately arranged with the separators 33, which are nonwoven fabric made of polyolefin or the like, being interposed. Each of the separators includes an electrolyte solution of potassium hydroxide or the like impregnated therein.

Figure 14:
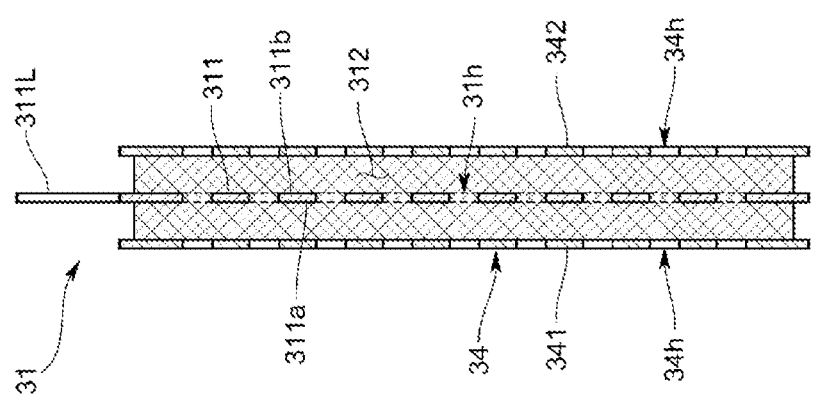
FIG. 14 is a longitudinal sectional view of a structure of a positive electrode according to the third embodiment.

As shown in FIG. 14, the positive electrode plate 31 includes a positive current collector substrate 311 of a metal plate provided with a large number of through holes 31h penetrating in the thickness direction, and a positive active material 312 that is filled in the through holes 31h in the positive current collector substrate 311 and is provided at a first surface 311a and a second surface 311b (hereinafter, also referred to as both surfaces) of the positive current collector substrate 311.

Figure 15:
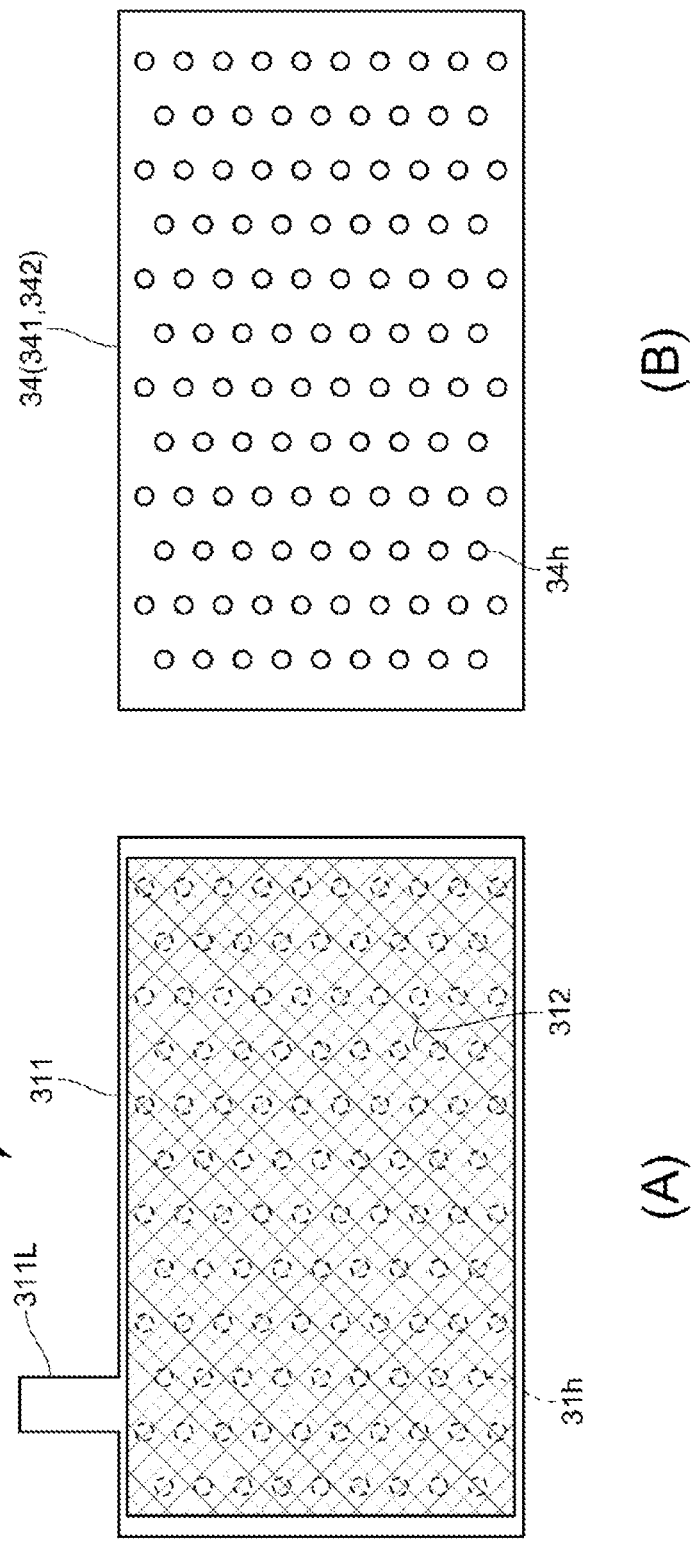
FIGS. 15(A) and 15(B) are developed plan views of a positive electrode plate and a cover according to the third embodiment.

As shown in FIG. 15(A), the positive current collector substrate 311 has a generally rectangular shape in a planar view in a state where the positive electrode plate 31 is developed, and is provided at the upper end with a lead piece 311L. The positive current collector substrate 311 is a punched steel plate coated with nickel or the like and has the through holes 31h provided by punching a flat metal plate (such as a rolled sheet). The positive current collector substrate 311 is preferably made of steel because it can be pressed sufficiently. The positive current collector substrate 311 is preferably 10 µm or more and more preferably 20 µm or more in thickness.

The positive current collector substrate 311 has the through holes 31h at an aperture ratio from 5 to 60%, for example. The function of holding the active material is deteriorated if the aperture ratio is lower than 5%, whereas the current collecting function is deteriorated if the aperture ratio exceeds 60%. Each of the through holes 31h is an opening in a circular shape, and has an opening diameter from 0.5 mm to 2.0 mm. It is difficult to form the through holes if the opening diameter is smaller than 0.5 mm, whereas the current collecting function may be deteriorated if the opening diameter exceeds 2.0 mm. Alternatively, the through holes 31h can have various opening shapes such as elliptic shapes, oval shapes, polygonal shapes including triangular shapes, rectangular shapes, and rhombic shapes. The opening diameter herein indicates a diameter of a circle, a short diameter of an ellipse, a shortest side of a triangle, a minimum diagonal of a polygon such as a rectangle or a rhombus.

The positive active material 312 is provided substantially equally at the both surfaces of the positive current collector substrate 311, and can be nickel hydroxide in the case of a nickel-cadmium battery, and can be nickel hydroxide including calcium hydroxide added thereto in the case of a nickel-metal hydride battery. The positive active material 312 can be provided by applying to the positive current collector substrate 311 or by compression molding.

The negative electrode plate 32 includes a negative current collector substrate of a punched steel plate coated with nickel plating similarly to the positive electrode plate 31 and a negative active material applied on the negative current collector substrate. The negative active material can be a mixture of a cadmium oxide powder and a metal cadmium powder in the case of a nickel-cadmium battery, and can be mainly a hydrogen storage alloy powder of the $AB_5$ type (the rare earth system), the $AB_2$ type (the Laves phase), or the like, in the case of a nickel-metal hydride battery.

The positive electrode plates 31 and the negative electrode plates 32 are each configured by not a foamed substrate made of porous nickel or the like but a two-dimensional substrate such as a punched steel plate. The punched steel plate is more likely to have separation of an active material rather than a foamed substrate that has a three-dimensional structure. The punched steel plate is more elastic than a foamed substrate, thereby exerting a significant effect when the electrode assembly is expanded and contracted. Use of a plurality of punched steel plates exerts a more significant effect.

As shown in FIGS. 13 and 14, in the present embodiment, there is provided a cover 34 that entirely covers the both surfaces of the positive electrode plate 31. This cover 34 is a metal plate provided with a large number of through holes 34h penetrating in the thickness direction, and is in contact with the positive active material 312 so as to sandwich the positive active material 312 between the positive current collector substrate 311 and the cover 34. More specifically, as shown in FIG. 14, the cover 34 includes a first cover portion 341 and a second cover portion 342. The first cover portion 341 is in contact with the positive active material 312 provided at the first surface 311a of the positive current collector substrate 311. The second cover portion 342 is in contact with the positive active material 312 provided at the second surface 311b of the positive current collector substrate 311. The positive electrode plate 31 is sandwiched between the first cover portion 341 and the second cover portion 342.

The first cover portion 341 and the second cover portion 342 have substantially same shapes. As shown in FIG. 15(B), each of the first cover portion 341 and the second cover portion 342 has a generally rectangular shape in a planar view in the state where the cover is developed, and has the shape substantially same as that of the positive current collector substrate 311 excluding the lead piece 311L. Each of the first cover portion 341 and the second cover portion 342 is a punched steel plate coated with nickel plating similarly to the positive current collector substrate 311, and is provided with the through holes 34h that are equal in shape to the through holes 31h in the positive current collector substrate 311 at the equal aperture ratio. In short, the first cover portion 341 and the second cover portion 342 are configured identically with the positive current collector substrate 311, thereby to reduce the production cost. The cover 34 sandwiching the positive electrode plate 31 can be alternatively plated with metal other than nickel. The cover 34 can be made of metal that is stable at the potential of the positive electrode plate 31, namely, nickel or metal other than nickel, or resin coated with nickel.

As shown in FIG. 13, in the state where the positive electrode plate 31 and the negative electrode plate 32 are accommodated in the battery case 2, the electrode assembly 3 according to the present embodiment has linear slits 31a and 32a that axially extend from the axial first end to the second axial end of the cylinder, so that a section perpendicular to the axial direction has a C shape. The positive electrode plate 31 and the negative electrode plate 32 are concentrically and alternately arranged with the separators 33 being interposed such that the slit 31a of the positive electrode plate 31 and the slit 32a of the negative electrode plate 32 are located as to orient in the same direction and communicate each other. The cylindrical battery including the electrode assembly 3 configured as described above causes less relative shift between the positive electrode plate 31, the negative electrode plate 32, and the separators 33. The positive electrode plate 31 and the negative electrode plate 32 are expanded and contracted around portions facing the slits 31a and 32a, so that the electrode assembly 3 can be easily reduced in diameter upon insertion into the battery case 2 and the electrode assembly 3 can be easily pressed against the battery case 2 after the insertion. As shown in FIG. 10 according to the second embodiment, the slits 31a and 32a of the positive electrode plate 31 and the negative electrode plate 32 can be alternatively located at circumferentially different positions. In this configuration, in the electrode assembly 3 that can be expanded and contracted upon insertion into the battery case 2 and have the slit 31a of the positive electrode plate 31 and the slit 32a of the negative electrode plate 32 located at the circumferentially different positions, the expansion/contraction center (the portion facing the slit 31a) of the positive electrode plate 31 and the expansion/contraction center (the portion facing the slit 32a) of the negative electrode plate 32 are located at circumferentially different positions. The positive electrode plate 31 and the negative electrode plate 32 adjacent to each other are less likely to be relatively shifted, and are less likely to be loosened after the insertion into the battery case 2.

Next described briefly is a method of producing the alkaline secondary battery 100 configured as described above.

Initially, the first cover portion 341 and the second cover portion 342 are located at respective surfaces of one positive electrode plate 31, so that the single positive electrode plate 31 is sandwiched between the first cover portion 341 and the second cover portion 342. The structured product as described above and one negative electrode plate 32 are layered with the separators 33 being interposed. The layered product thus configured is wound once to form the electrode assembly 3 in the cylindrical shape, and then it is arranged in the battery case 2. When the electrode assembly 3 is accommodated in the battery case 2, the electrode assembly 3 is reduced in outer diameter due to the slit 31a of the positive electrode plate 31 and the slit 32a of the negative electrode plate 32. It is thus possible to prevent troubles that the negative active material at the outer circumferential surface 3n of the electrode assembly 3 is brought into contact with the battery case 2 and is scraped, for example. In a configuration including a current collecting plate, after the electrode assembly 3 is arranged in the battery case 2, the negative electrode plate 32 is connected by welding or the like to the battery case 2 with the current collecting plate or the like being interposed. The electrolyte solution is then filled into the battery case 2. The lead piece 311L of the positive electrode plate 31 is connected to the rear surface of the sealing member 5 directly or by way of a current collecting plate (not shown). The sealing member 5 is fixed by caulking or the like to the upper opening of the battery case 2 with the insulating member 4 being interposed. Alternatively, the positive electrode plate 31, the negative electrode plate 32, and the separators 33 can be individually wound into a cylindrical shape and be accommodated into the battery case 2 one by one.

Next, a test was performed to compare 0.2 ItA discharge efficiency (%), 1 ItA discharge efficiency (%), and 3 ItA discharge efficiency (%), among a sealed nickel-metal hydride battery as the alkaline secondary battery according to the present invention and conventional sealed nickel-metal hydride batteries. In the sealed nickel-metal hydride battery according to the present invention, a positive active material is applied to a punched steel plate as the positive current collector substrate and a cover is provided (positive current collector substrate: punched steel plate/cover: provided). The conventional sealed nickel-metal hydride batteries include a battery in which a foamed nickel porous body as the positive current collector substrate holds a positive active material and no cover is provided (positive current collector substrate: foamed nickel porous body/cover: not provided), a battery in which a foamed nickel porous body as the positive current collector substrate holds a positive active material and a cover is provided (positive current collector substrate: foamed nickel porous body/cover: provided), and a battery in which a positive active material is applied to a punched steel plate as the positive current collector substrate and no cover is provided (positive current collector substrate: punched steel plate/cover: not provided). Table 1 indicates results of the test. Negative electrodes, Positive electrodes, and the sealed nickel-metal hydride batteries used in the test were prepared in the following manner, and the test was performed under the following conditions.

(1) Preparation of Negative Electrode of Sealed Nickel-metal Hydride Battery

An aqueous solution obtained by dissolving a thickener (methylcellulose) therein was added to 100 parts by mass of a hydrogen storage alloy powder having the composition of La0.65Pr0.2Mg0.15Ni3.5Al0.1 (D50=50 rpm), and 1 part by mass of a binder (styrene-butadiene rubber (SBR)) was further added thereto. The paste thus obtained was applied to both surfaces of a punched steel plate of 35 μm thick (aperture ratio: 50%/hole diameter:1 mm) and was dried. The punched steel plate was then pressed against to have 0.40 mm in thickness so as to obtain a negative electrode plate.

(2) Preparation of Positive Electrode of Sealed Nickel-metal Hydride Battery (2-1) Where Positive Current Collector Substrate is Foamed Nickel Porous Body and No Cover is Provided A positive active material was used in which nickel hydroxide containing 3% by mass of zinc and 0.6% by mass of cobalt in a solid solution was coated with 6% by mass of cobalt hydroxide, and was then oxidized with air at 110° C. for one hour using a 18 M sodium hydroxide solution. An aqueous solution obtained by dissolving a thickener (carboxymethyl-cellulose) therein, an active material, and an aqueous PTFE (polytetrafluoroethylene) solution having a solid content of 0.3% by mass were mixed together to prepare a paste. The paste was filled in a nickel foamed substrate and dried. The nickel foamed substrate was then pressed into a predetermined thickness (0.97 mm) to obtain a positive electrode plate.

(2-2) Where Positive Current Collector Substrate is Foamed Nickel Porous Body and Cover is Provided A positive electrode plate was prepared in the same manner in (2-1) described above, and the positive electrode plate was sandwiched from both surfaces by a cover, namely, a punched steel plate of 35 μm thick (aperture ratio: 50%/hole diameter:1 mm).

(2-3) Where Positive Current Collector Substrate is Punched Steel Plate and No Cover is Provided A positive active material was used in which nickel hydroxide containing 3% by mass of zinc and 0.6% by mass of cobalt in a solid solution was coated with 6% by mass of cobalt hydroxide, and was then oxidized with air at 110° C. for one hour using a 18 M sodium hydroxide solution. An aqueous solution obtained by dissolving a thickener (carboxymethyl cellulose) therein, an active material, an aqueous SBR solution having a solid content of 1% by mass, and an aqueous PTFE solution having a solid content of 0.5% by mass were mixed together to prepare a paste. The paste was applied to both surfaces of a punched steel plate of 35 μm thick (aperture ratio: 50%/hole diameter:1 mm) and dried. The punched steel plate was then pressed against to have 0.96 mm in thickness so as to obtain a positive electrode plate.

(2-4) Where Positive Current Collector Substrate is Punched Steel Plate and Cover is Provided A positive electrode plate was prepared in the same manner in (2-3) described above, and the positive electrode plate was sandwiched from both surfaces by a cover, namely, a punched steel plate of 35 μm thick (aperture ratio: 50%/hole diameter:1 mm).

(3) Preparation Of Sealed Nickel-metal Hydride Battery

The positive electrode and the negative electrode were wound at 1:1.30 as the ratio of positive capacity to negative capacity, with separators being interposed, so as to form an electrode assembly, which was accommodated in a cylindrical battery case. The battery case was filled with 1.95 ml of an electrolyte solution including 7 M potassium hydroxide and 0.8 M lithium hydroxide, and sealed with a metal lid having a safety valve, so as to prepare a nickel-metal hydride rechargeable battery of the AA size having the capacity of 1000 mAh. The positive and negative electrodes were wound once.

(4) Evaluation of Sealed Nickel-metal Hydride Battery (4-1) Comparative Test of 0.2 ItA Discharge Efficiency (%)

The batteries were charged for ten hours at 0.1 ItA (100 mA), were left for one hour, and were discharged at 0.2 ItA to 1.0 V at 20° C. in one cycle. The batteries were then charged for 16 hours at 0.1 ItA (100 mA), were left for one hour, and were discharged at 0.2 ItA to 1.0 V repetitively in three charge-discharge cycles for formation.

The batteries were then charged for 16 hours at 0.1 ItA (100 mA), were left for one hour, and were discharged at 0.2 ItA to 1.0 V at 20° C. in one cycle, to measure discharge capacity. It is noted that the following equation is established: 0.2 ItA discharge efficiency (%)={0.2 ItA discharge capacity/theoretical capacity of positive active material (calculated assuming that Ni corresponds to one electron reaction)}×100.

(4-2) Comparative Test of 1 ItA Discharge Efficiency (%)

The batteries were charged for ten hours at 0.1 ItA (100 mA), were left for one hour, and were discharged at 0.2 ItA to 1.0 V at 20° C. in one cycle. The batteries were then charged for 16 hours at 0.1 ItA (100 mA), were left for one hour, and were discharged at 0.2 ItA to 1.0 V repetitively in three charge-discharge cycles for formation.

The batteries were then charged for 16 hours at 0.1 ItA (100 mA), were left for one hour, and were discharged at 1 ItA to 1.0 V at 20° C. in one cycle, to measure discharge capacity. It is noted that the following equation is established: 1 ItA discharge efficiency (%)=(1 ItA discharge capacity/theoretical capacity of positive active material (calculated assuming that Ni corresponds to one electron reaction))×100.

(4-3) Comparative Test of 3 ItA Discharge Efficiency (%)

The batteries were charged for ten hours at 0.1 ItA (100 mA), were left for one hour, and were discharged at 0.2 ItA to 1.0 V at 20° C. in one cycle. The batteries were then charged for 16 hours at 0.1 ItA (100 mA), were left for one hour, and were discharged at 0.2 ItA to 1.0 V repetitively in three charge-discharge cycles for formation.

The batteries were then charged for 16 hours at 0.1 ItA (100 mA), were left for one hour, and were discharged at 3 ItA to 1.0 V at 20° C. in one cycle, to measure discharge capacity. It is noted that the following equation is established: 3 ItA discharge efficiency (%)=(3 ItA discharge capacity/theoretical capacity of positive active material (calculated assuming that Ni corresponds to one electron reaction))×100.

TABLE 1

| Positive current collector substrate | Cover | 0.2 ItA discharge efficiency (%) | 1 ItA discharge efficiency (%) | 3 ItA discharge efficiency (%) |
| --- | --- | --- | --- | --- |
| Foamed nickel porous body | Not provided | 95.7 | 51.5 | 17.2 |

TABLE 1-continued

| Positive current collector substrate | Cover | 0.2 ItA discharge efficiency (%) | 1 ItA discharge efficiency (%) | 3 ItA discharge efficiency (%) |
|---|---|---|---|---|
| Foamed nickel porous body | Provided | 95.8 | 52.0 | 22.0 |
| Punched steel plate | Not provided | 88.6 | 31.1 | 3.6 |
| Punched steel plate | Provided | 94.7 | 38.5 | 5.8 |

As apparent from Table 1, the battery including the punched steel plate as the positive current collector substrate and including no cover has discharge efficiency lower than that of the battery including the foamed nickel porous body. Regarding the 0.2 ItA discharge efficiency and the 1 ItA discharge efficiency, the batteries each including the foamed nickel porous body as the positive current collector substrate exert substantially equal discharge efficiency regardless of whether or not the cover is provided. In contrast, the battery including the punched steel plate as the positive current collector substrate exerts significantly improved discharge efficiency by the provision of the cover. Regarding the 3 ItA discharge efficiency, the battery including the foamed nickel porous body as the positive current collector substrate also exerts higher discharge efficiency at a high rate by the provision of the cover. The battery including the punched steel plate as the positive current collector substrate exerts higher discharge efficiency when being discharged at the low rate of 0.2 ItA as compared with a case of being discharged at the high rate of 1 ItA. The battery including the positive current collector substrate of the punched steel plate provided with the cover of a punched steel plate exerts discharge efficiency substantially equal to that of the battery including the foamed nickel porous body. The cover provided on a surface not facing the negative electrode plate can have a smaller aperture ratio.

Effects of Third Embodiment

In the alkaline secondary battery 100 according to the third embodiment thus configured, the positive electrode plate 31, which includes the positive current collector substrate 311 of the punched steel plate provided with the large number of through holes 31h and the positive active material 312 held by the positive current collector substrate 311, is sandwiched between the first cover portion 341 and the second cover portion 342. It is thus possible to prevent separation of the positive active material 312 from the positive current collector substrate 311, thereby improving current collection efficiency. The cover portions 341 and 342 are configured by the punched steel plates, so that a current collection path from the positive active material 312 apart from the positive current collector substrate 311 can be provided through the cover portions 341 and 342. This also leads to improvement in current collection efficiency. Furthermore, the positive current collector substrate 311 is configured by the punched steel plate provided with the large number of through holes 31h, and the cover portions 341 and 342 are also configured in similar manners. These configurations do not disturb shift of the electrolyte solution and ions. Each of the positive current collector substrate 311 and the cover portions 341 and 342, which is configured by the punched steel plate, can exert strength even with a small thickness. Furthermore, the elastic cover portions 341 and 342 can constantly press the positive active material 312 toward the positive current collector substrate 311 in accordance with expansion and contraction of the positive active material 312.

It is noted that the present invention is not limited to the third embodiment. For example, the electrode assembly according to the third embodiment is configured such that the positive electrode plate wound once and the negative electrode plate wound once are concentrically located with the separators being interposed. Alternatively, the positive electrode plate and the negative electrode plate can be wound spirally for a plurality of times. Further alternatively, a plurality of positive electrode plates and a plurality of negative electrode plate can be concentrically and alternately located with the separators being interposed respectively.

According to the third embodiment, the cover is located at the both surfaces of the positive electrode plate. The cover can be alternatively provided at any one of the surfaces. In the case of an electrode assembly, in which winding is performed for a plurality of times, tend to be loosened because the innermost portion of the electrode assembly does not receive pressure. It is thus preferred to provide the cover at the both surfaces or one of the surfaces of the innermost positive or negative electrode plate.

According to the third embodiment, only the positive electrode plate is sandwiched by the cover. Alternatively, the negative electrode plate can be also sandwiched by a cover. This configuration prevents separation of the negative active material, thereby improving current collection efficiency and charge-discharge efficiency. The cover sandwiching the negative electrode plate is preferably made of a material that is stable at the potential of the negative electrode plate, namely, copper, nickel, or iron coated with nickel.

Furthermore, according to the third embodiment, one cover portion is provided at each of the first and second surfaces of the positive electrode plate. Alternatively, the cover portion located at each of the first and second surfaces of the positive electrode plate can be circumferentially or axially divided into a plurality of cover pieces, for example.

Moreover, the positive current collector configured by the punched steel plate in the third embodiment can be made of expanded metal. The expanded metal preferably has an aperture ratio from 5% to 60%. The function of holding the active material is deteriorated if the aperture ratio is lower than 5%, whereas the current collecting function is deteriorated if the aperture ratio exceeds 60%.

Figure 16:
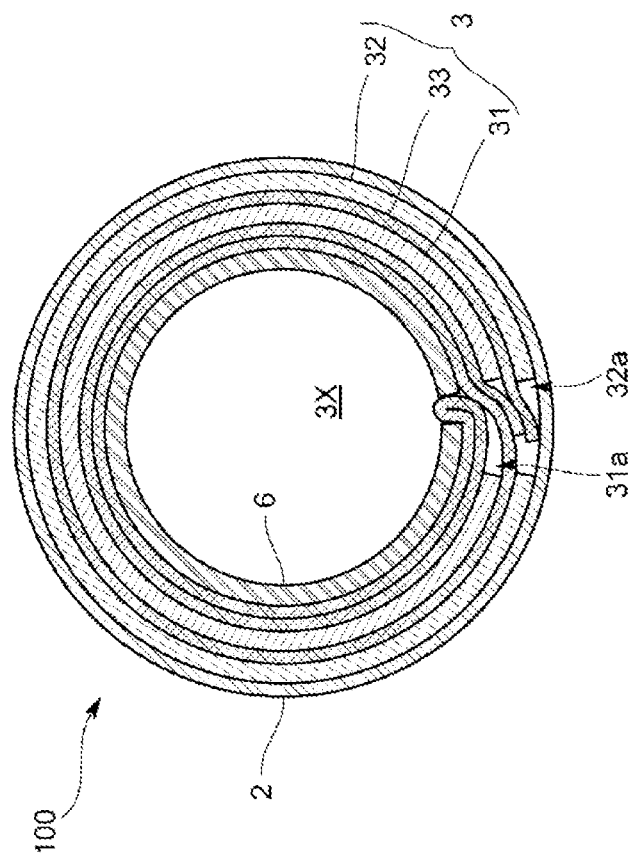
FIG. 16 is a transverse sectional view of an alkaline secondary battery according to a modified embodiment.

Furthermore, as shown in FIG. 16, the alkaline secondary battery 100 according to the third embodiment preferably includes a holder member 6 that is arranged in the hollow portion 3X of the electrode assembly 3 and is in contact with the inner circumferential surface of the electrode assembly 3 so as to hold the electrode assembly 3 of which outer circumferential surface 3n is kept in contact with the inner circumferential surface 2m of the battery case 2. This holder member 6 is configured similarly to that of the first embodiment.

According to the third embodiment, the electrode assembly is provided at the outermost portion thereof with the negative electrode plate. The present invention is not limited to this configuration, and the electrode assembly can be provided at the outermost portion thereof with a positive electrode plate.

Each of the separators can have a bag shape and be made of polyethylene or the like, so as to accommodate the positive electrode plate 31.

The battery according to the third embodiment has the cylindrical shape. The battery can alternatively have a rectangular shape. The present invention is applicable not only to an alkaline secondary battery but aalso to a secondary battery such as a lithium ion secondary battery and a primary battery.

The present invention is not limited to the first to third embodiments, but can be obviously modified in various manners within the scope of the object thereof.

INDUSTRIAL APPLICABILITY

According to the present invention, the cylindrical electrode assembly can be prevented from distortion in a wound shape due to a difference in height at an initially wound portion and tears in an electrode.

The invention claimed is:

1. A cylindrical battery comprising a cylindrical battery case and a cylindrical electrode assembly arranged in the battery case and including a positive electrode, a negative electrode, and a separator, wherein
the electrode assembly has a slit extending from a first axial end to a second axial end of an axis of the cylindrical battery,
at least one of the positive electrode and the negative electrode is positioned at a diametrically opposite location of the slit with respect to the axis,
the separator has the slit, and
each of the positive electrode, the negative electrode and the separator is wound once, the each of the positive electrode, the negative electrode and the separator having a rectangular shape in a planar view before being wound.

2. The cylindrical battery according to claim 1, wherein the positive electrode and the negative electrode are arranged with the separator being interposed therebetween in the electrode assembly, and the slit of the positive electrode and the slit of the negative electrode are located at circumferentially same positions.

3. The cylindrical battery according to claim 1, wherein the positive electrode and the negative electrode are arranged with the separator being interposed therebetween in the electrode assembly, and
at least a set of the slit of the positive electrode and the slit of the negative electrode, which are adjacently arranged via separators in the electrode assembly, are located at circumferentially different positions.

4. The cylindrical battery according to claim 3, wherein the slit of the positive electrode and the slit of the negative electrode, which are adjacently arranged via each separator in the electrode assembly, are located at circumferentially different positions.

5. The cylindrical battery according to claim 3, the different positions are circumferentially opposite to each other.

6. The cylindrical battery according to claim 1, wherein each of the positive electrode, the negative electrode and the separator in the electrode assembly is wound once around the axis.

7. The cylindrical battery according to claim 1, wherein an outermost electrode in the electrode assembly is in contact with the battery case.

8. The cylindrical battery according to claim 1, further comprising a holder member arranged in a hollow portion of the electrode assembly, between the positive electrode and the separator, or between the negative electrode and the separator, for pressing the electrode assembly from inside to hold the electrode assembly.

9. The cylindrical battery according to claim 1, wherein each of the positive electrode and the negative electrode includes a current collector substrate and an active material provided on the current collector substrate.

10. The cylindrical battery according to claim 9, wherein the current collector substrate is elastic and presses the electrode assembly.

* * * * *